Sept. 29, 1953    R. A. GRINDSTAFF    2,653,570
ANIMAL FEEDER
Filed Aug. 18, 1952
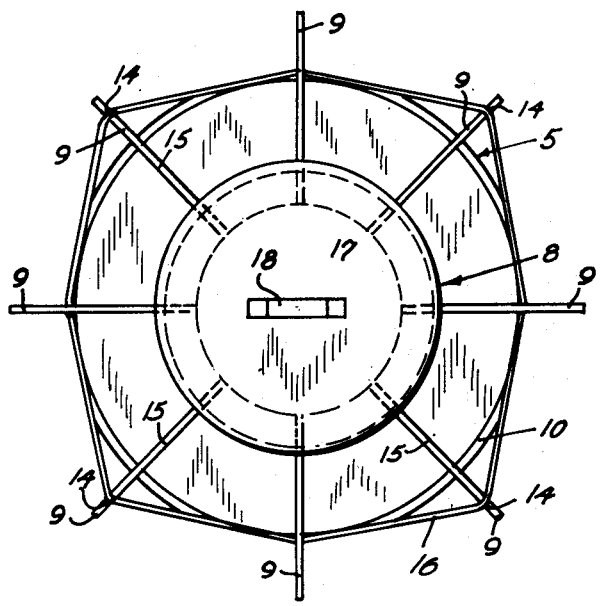
Fig.1
Fig.2
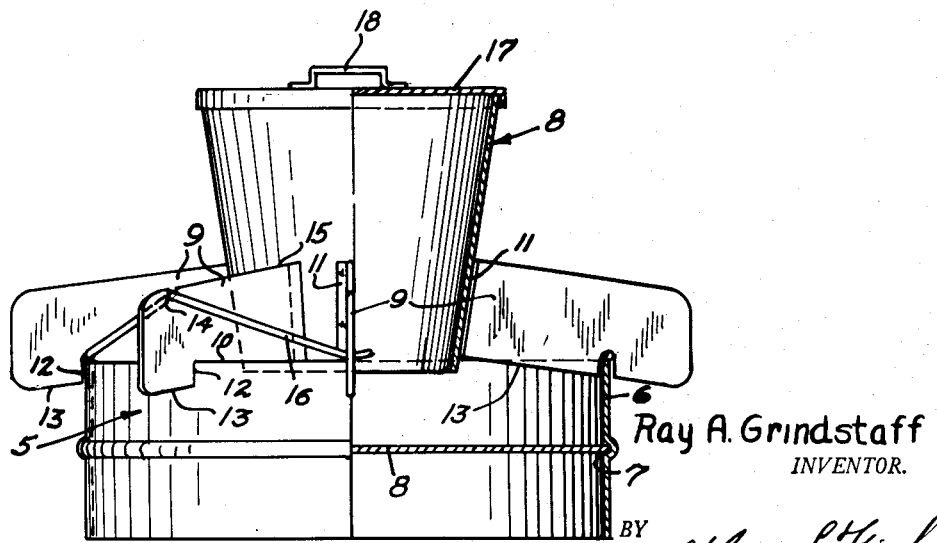
Ray A. Grindstaff
INVENTOR.
BY
ATTORNEY Patented Sept. 29, 1953

2,653,570

UNITED STATES PATENT OFFICE 2,653,570

ANIMAL FEEDER

Ray A. Grindstaff, Spokane, Wash.

Application August 18, 1952, Serial No. 305,049

2 Claims. (Cl. 119—52)

My present invention is an improved feeder and constitutes an improvement over my invention as described and claimed in Letters Patent No. 2,505,396 of April 25, 1950.

A principal object of the invention lies in the provision of a feeder primarily designed for use by rabbits and which is particularly adapted to eliminate feed waste.

Another object of the invention lies in the provision of a feeder having feeding spaces defined by partitions and having access openings protected by a taut wire disposed to prevent a feeding animal from pawing the feed over the outer defining edge of the access opening.

Another object of the invention lies in the provision of a feeder which is designed and constructed of a minimum number of parts which may be manufactured at a low cost.

Another object of the invention lies in the provision of a feeder which may be easily serviced and claimed by the hutch keeper.

A still further object of the invention lies in the provision of a feeder so designed as to prevent the rabbits from scattering or contaminating the feed.

These and other objects of the invention will become apparent during the course of the following description.

In the accompanying drawings, forming a part of this specification, and in which like numerals are employed to designate like parts, Figure 1 is a plan view of my improved feeder, and Figure 2 is a view of the feeder, partially in side elevation and partially in vertical cross section.

The improved feeder, constituting the subject matter of this application, has a base or pan 5, formed of sheet metal or other suitable material, and the pan is provided with a vertical side wall 6 which is circular in plan. Substantially midway the height of the wall 6 I have provided an annular expressed recess 7 forming a seat for the bottom 8' of the pan 5.

Over the pan is disposed a funnel shaped hopper 8 also formed of sheet metal, and is supported centrally of the pan by plates 9 of sheet metal and constituting partitions which divide the space about the hopper into individual feeding spaces having access openings disposed between the partitions 9 and accessible from positions radially about the feeder. The upper marginal edge 10 of the wall 6 defines the outer edge of the access openings which are also defined on the other sides by the hopper and the partitions 9.

The inner ends of the partitions 9 are bent to form flanges 11 at right angle to the partition and which are spot welded to the hopper 8. Slots 12 lead from the lower edge 13 of each partition and are disposed to receive the upper marginal edge 10 of the pan 5. Alternate ones of the partitions 9 are provided with upper vertical slots 14 leading downwardly from the upper edge 15 of the partitions and the slots 14 are disposed outwardly of the slots 12 a distance.

Threaded or trained in slots 12 and 14 alternately is a taut wire 16 which is thus disposed substantially vertically above the outer defining edge 10 of the access openings and extends transversely across each said opening at an angle. By the term "wire" I do not mean to limit myself to metal but prefer to use the term as a generic term including all heretofor or hereafter discovered materials which may be used to the purpose described herein and only as expressly limited by the appended claims.

When a rabbit is feeding from my improved feeder, he must either feed under the wire 16 near the partition 9 where the wire is raised and trained in slot 14, if he is small, or he will feed over the wire 16 near the partition 9 where wire 16 passes under slot 12. When feeding under the wire, it holds the rabbit sufficiently close to the pan that he cannot paw the feed out over the edge 10, and when feeding over the wire he cannot paw because his heels catch on the wire and also he slides down against the partition which confines him.

To prevent larger rabbits from eating or pawing at the feed in the hopper, I have provided a cover or closure 17 which has a suitable handle 18 for the convenience of the one servicing the feeder.

Having thus described my invention, I claim:

1. A feeder comprising a pan constituting a base, a downwardly tapered hopper over the center of the pan and open at upper and lower ends, a closure for the upper end of said hopper, plates carried by said hopper and projecting radially therefrom and spaced from each other circumferentially of the hopper, said plates extending outwardly at a downward incline from the hopper, outer end portions being formed with lower vertical slots leading from their lower edges and adapted to receive the upper marginal edge portion of said pan, said plates supporting the hopper over the pan centrally thereof and constituting partitions dividing the pan into feeding spaces about the hopper, upper vertical slots leading from the upper edge of alternate plates and disposed outwardly of said lower vertical slots, and a taut wire about the feeder and trained in alternate lower and upper vertical slots, whereby the feeding animal is prevented from pawing feed from the feeder.

2. A feeder comprising a pan constituting a base, a downwardly tapered hopper over the center of the pan and open at upper and lower ends, a closure for the upper end of said hopper, plates carried by said hopper and projecting radially therefrom and spaced from each other circumferentially of the hopper, said plates extending outwardly at a downward incline from the hopper, outer end portions being formed with lower vertical slots leading from their lower edges and adapted to receive the upper marginal edge portion of said pan, said plates supporting the hopper over the pan centrally thereof and constituting partitions dividing the pan into feeding spaces about the hopper, upper vertical slots leading from the upper edge of alternate plates, and a taut wire about the feeder and trained in alternate lower and upper vertical slots, whereby the feeding animal is prevented from pawing feed from the feeder.

RAY A. GRINDSTAFF.

References Cited in the file of this patent

UNITED STATES PATENTS

| Number | Name | Date |
|---|---|---|
| 1,067,824 | Leichtfuss | July 22, 1913 |
| 1,329,288 | Carpenter | Jan. 27, 1920 |
| 1,485,469 | Riegel | Mar. 4, 1924 |
| 1,525,562 | Baird | Feb. 10, 1925 |
| 1,536,699 | Whitman | May 5, 1925 |
| 1,662,204 | Parkhurst | Mar. 13, 1928 |
| 1,666,322 | West | Apr. 17, 1928 |
| 1,829,682 | Speicher | Oct. 27, 1931 |
| 2,571,004 | Bacon | Oct. 9, 1951 |
| 2,612,137 | Fuls | Sept. 30, 1952 |